United States Patent [19]
Bockman

[11] 3,733,061
[45] May 15, 1973

[54] GAS-LIQUID CONTACT APPARATUS

[75] Inventor: Ole Kristian Bockman, Oslo, Norway

[73] Assignee: Aktiebolaget Svenska Flaktfabriken, Stockholm, Sweden

[22] Filed: Oct. 26, 1970

[21] Appl. No.: 83,809

[30] Foreign Application Priority Data

Nov. 13, 1969 Norway..................................4499

[52] U.S. Cl..................261/21, 261/23 R, 261/98, 55/91
[51] Int. Cl. ................................................B01f 3/04
[58] Field of Search ...................55/91, 99; 261/94, 261/95, 98, 23 R, 21

[56] References Cited

UNITED STATES PATENTS

| | | | |
|---|---|---|---|
| 3,219,324 | 11/1965 | Williams et al. | 261/95 |
| 3,348,825 | 10/1967 | McIlvaine | 261/98 |
| 3,445,182 | 5/1969 | Tomany | 261/94 |
| 3,350,075 | 10/1967 | Douglas | 55/91 |

FOREIGN PATENTS OR APPLICATIONS

| | | | |
|---|---|---|---|
| 135,468 | 8/1960 | U.S.S.R. | 261/94 |
| 144,830 | 4/1962 | U.S.S.R. | 261/94 |

*Primary Examiner*—Tim R. Miles
*Attorney*—Howson & Howson

[57] ABSTRACT

An apparatus for obtaining interphase contact between fluids, particularly gas and liquid, wherein a gas is caused to flow upwardly through a substantially vertical contact zone providing a so-called fluidized bed of contact bodies. The velocity of the gas entering the contact zone is held at a value at least to prevent discharge of the liquid upwardly from the contact zone and downwardly through the gas entrance. Means is provided to collect the liquid at a location close to the gas entrance and to drain off the liquid from the liquid-collecting means at a controlled rate whereby a portion of the collected liquid may be recirculated into the gas entering the contact zone. The collection means comprises an annular gutter at the bottom of the contact zOne and the gas entering the contact zone is injected through the center of the gutter along with a jet of fresh liquid issuing from a nozzle mounted centrally under the gutter.

11 Claims, 9 Drawing Figures

GAS-LIQUID CONTACT APPARATUS

The present invention relates to apparatus for establishing contact between fluids, particularly between gases and liquids, wherein contact is established by means of lightweight contact elements in motion.

Methods and apparatus for treatment of fluids are formerly known wherein contact between a liquid an a fluid is achieved in a vertical contact zone containing a bed of contact spheres kept in motion between foraminous top and bottom partition walls (grids, grills) by a gas flow supplied from a lower gas inlet chamber beneath the bottom partition and removed from the contact zone through an upper gas outlet chamber above the top partition. A liquid is supplied to the contact zone from liquid supply means arranged in the upper chamber and is removed from the contact zone through an outlet in the bottom of the lower chamber (counter current contact). In another known process a liquid is supplied from beneath the bottom partition of the contact zone so that gas and liquid enter the treatment zone in the same upward direction.

It is known in the art that a bed of liquid-covered elements in free random motion is in principle unstable in operation when the process is going on. The reason for this is that a rather tightly packed bed of contact elements offers far greater resistance to gas throughflow than an open bed with widely separated contact elements and large open throughflow area for the gas. Thus, in the case of equal pressure drop over the whole cross section of the bed, there may be individual zones of highly varied specific through-flows. For this reason, breakthrough zones occur, in which the elements are caused to float and move upwards with the gas flow, widely spaced from each other, while the rest of the bed remains relatively quiescent and lies relatively tightly packed against the lower limiting grid of the contact zone.

Because of the constricted channels formed between the elements when at rest, the throughflow resistance is high in these zones, even when only small quantities of gas are flowing through. To what extent such zones and breakthrough zones are formed in the contact element bed depends upon the geometric proportions of the contact zone.

Thus, gas distribution is uneven in a contact zone of this kind. If liquid is supplied in counter-current, the motion of the gas and the contact elements at high throughflow speed will carry away the atomized liquid from the zone before it has progressed beyond the upper part of the contact zone, and together with the contact elements it will fall down into zone sections with low throughflow speed. Thus, an uneven distribution of the gas/liquid is created over the cross section of the contact zone. For this reason, rather large quantities of liquid must be supplied to ensure the necessary minimum of liquid in those parts of the contact zone which have the highest gas throughflow.

When liquid is supplied in the same direction as the gas, the disadvantage is avoided since the liquid will automatically be supplied in the largest quantity to the break-through areas of the contact zone. Owing to the vertical upward pressure of the gas and liquid current, the breakthrough area in a contact zone in co-current will be concentrated immediately over the liquid supply device. Thus, the movement in the contact zone is stabilized to an irregular circulating motion with the correct gas and liquid proportions in the active parts of the contact zone. This is the reason why a higher efficiency is obtained from a contact zone of this kind (co-current contact).

Generally, contact elements are made of various types of plastic, which afford a hard, smooth, elastic and preferably slightly self-lubricating surface. These materials, however, are to a certain extent water-repellent, and in general they are poorly wetted by most liquids. For this reason a large quantity of through-running or circulating liquid is required in the contact zone in order to ensure full wetting of the element surfaces and thus fully efficient gas/liquid contact in the element bed.

Owing to efficient gas/liquid contact in fluidized contact zone such processes have been used, inter alia, to purify gases with relatively low concentrations of impurities as gas or dust.

When the impurities include readily soluble gases, such as for example HF and HCl the quantities of the liquid generally required for the actual adsorption process are smaller than the quantity needed to obtain full wetting and thus full gas/liquid contact within the fluidized contact zone.

In the precipitation of solid impurities it is required that the liquid shall not become so sludgy that its wetting capacity is impaired, as it causes unacceptable wear of the contact elements and/or deposits on the contact elements in spite of the movement within the bed.

Many technically important gaseous impurities in exhaust gases are gases which when dissolved in water form strong or weak acids. As examples can be mentioned HF (aluminum industry) NO and $NO_2$ (chemical fertilizer industry), $SO_2$ and $SO_3$ (heating plant, ore refining plant, smelting processes and various chemical industrial processes) HCl (chemical processes, various smelting and refining processes) etc. In washing out this type of impurity it is frequently neither sufficient nor desirable to use only water for the process, since this only transfers the contamination problem from the gas phase to the liquid phase, i.e., from the air to the watershed or the sea. The washing process therefore generally includes chemical neutralization of the acid formed during the washing process. In order to avoid multiple operation systems it is generally technically and economically advantageous to use a liquid to which neutralizing chemicals are added direct in the contact zone.

In the case of absorption with chemicals added to the washing lye, the process is relatively independent of a co-current or counter-current effect in the contact zone. The necessary quantity of lye admixed for neutralizing of separated and absorbed gases in the apparatus will be inversely proportional to the chemical content of the lye. The necessary quantity of lye admixture in chemical solutions generally used in technical processes is normally far less than the liquid quantity required to ensure full wetting of the contact elements.

In the above mentioned cases, which include a great part of industrial gas cleaning processes using the known apparatus, the gas cleaning plant must include a recirculation system for liquid with sufficient capacity to ensure full wetting and full efficiency of the fluidized contact zone. Supply and removal of fresh water or washing lye from the apparatus normally forms only a fraction of the quantity of liquid at all times circulated. A circulation system of this kind, with pipes, reservoirs, pumps and regulating equipment will in practice account for a considerable proportion of the total cost of the washing plant. This is because it is generally necessary to dimension all equipment in the liquid circulation system for corrosive and/or sludge-bearing liquids. Furthermore, the total power requirement of the plant is considerably increased in relation to the necessary power to provide the through-currents of gas and liquid. This extra power requirement only benefits the actual washing process to a very small degree. For the liquid circulation process only the liquid atomizing pressure within the actual supply device of the apparatus will have any effect on the washing process. Pressure losses in pipes and valves, and static lifting heights also involve direct power losses. The same applies to the efficiency of the pump which is most usually low, since the pumps used are generally designed for heavy duty use, with sludge and acids in the recirculating liquid. The power requirements for a recirculation system of this kind may under certain circumstances be so great in relation to the other power requirements of the system that a plant of the kind mentioned above is unreasonably uneconomic to operate in spite of its high efficiency. This especially applies to low pressure washing of large quantities of gas with low impurity content.

The object of this invention is to provide apparatus of the kind mentioned, allowing a better utilization of liquid, and ensuring more controlled movement of the contact elements in the contact zone.

A more special object of the present invention is an apparatus for obtaining interphase contact between fluids, particularly gas and liquid, wherein a gas is caused to pass upwardly through a substantially vertical contact zone having lower and upper ends and a gas entrance at the lower end thereof, said contact zone containing a plurality of light weight contact bodies in shape of a fluidized bed achieved by means of the gas flow supplied to the contact zone through said gas entrance, and wherein a liquid is supplied to the contact zone and allowed to leave the zone at the lower end thereof, the contact bodies being prevented from escape from the contact zone, and wherein the velocity of the gas entering the contact zone is held at a value at least to prevent the liquid from leaving the contact zone through the gas entrance, wherein the apparatus for obtaining interphase contact between fluids, particularly gas and liquid, comprises a substantially vertical housing having at least a wall and upper and lower mutually spaced partition walls defining a gas and liquid contact chamber therebetween, said contact chamber containing a plurality of light weight contact bodies, such as spheres, a gas inlet chamber under the lower partition wall, a gas outlet chamber over the upper partition wall, said upper and lower partition walls at least partly penetratable to fluids and not penetratable to the contact bodies, means to supply liquid to the contact chamber arranged to be connected to liquid delivery means, said gas inlet chamber having at least one inlet opening arranged to be connected with gas delivery means, and a gas inlet passage between the gas inlet chamber and the contact chamber, wherein a bottom wall is provided between the contact chamber and the gas inlet chamber, said bottom wall having a gas passage opening with a cross section substantially smaller than the cross section of the contact chamber, and wherein liquid drainage means are provided adjacent the bottom wall to remove liquid from the contact chamber.

The invention will be further explained by means of examples, under reference to the drawing, where:

FIG. 2b shows a section at the line A—A in FIG. 2a.

Figure 1:
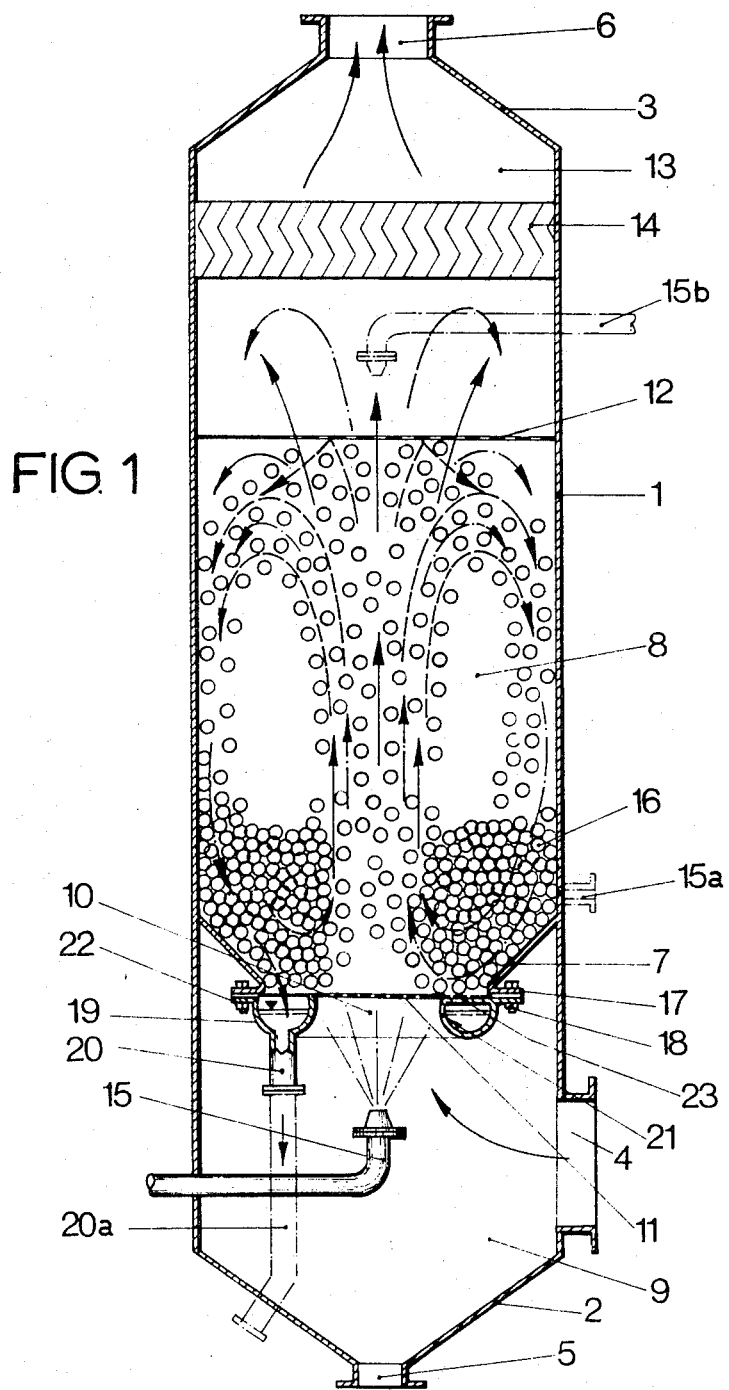
FIG. 1 shows a vertical section through an apparatus according to the invention.

FIG. 1 shows an apparatus according to the invention comprising a vertical housing 1 of cylindrical, square or other suitable section, with a funnelshaped bottom 2 and a cone-shaped top 3. In the side wall 1 of the housing, close to the bottom 2, is arranged an inlet orifice 4 for gas to be treated. The bottom 2 has a drain 5 for liquid and the top 3 has an outlet 6 for treated gas.

A partition wall 7 which forms the bottom of the contact chamber 8 of the apparatus divides the interior of the housing 1 into the mentioned contact chamber 8 and an inlet chamber 9. The partition wall 7 will hereinafter be called the bottom of the contact chamber; it has a preferably centrally arranged opening 10 which is covered by a grid 11. An upper grid 12 separates the contact chamber 8 from an outlet chamber 13. In the outlet chamber there is a mist eliminator 14. In the inlet chamber 9 under the opening 10 there is a nozzle means 15 which sprays liquid into the lower part of the contact chamber 8. Said chamber 8 contains spheres 16 of low specific weight, of suitable type. The grids 11 and 12 are impenetrable to the contact elements 16.

The inlet orifice 10 for gas and liquid is of substantially smaller cross section than the cross section of the contact chamber 8. The bottom wall 7 of the contact chamber is funnel-shaped. At the lower end of the bottom there is a radial external flange 17. To the underside of this flange is fastened with bolts 18 a mainly ring-formed drain gutter 19 for liquid of throughformed section. The gutter 19 has a drain union 20 which emerges into the inlet chamber 9. The wall of the gutter 19 towards the inlet orifice 10 or edge 21 is of rounded shape to reduce to flow resistance. Between the flange 17 of the bottom wall 7 and the mounting flange 22 of the gutter 19 is arranged the lower grid 11 and in addition a ring plate 23 to cover to a predetermined extent a portion of the upper side of the gutter 19. The plate 23 can be omitted if necessary. Some alternative arrangements are indicated in FIG. 1. Instead of the nozzle means 15, or in addition to this, an inlet for liquid can be arranged in the wall 1 of the contact chamber as indicated by the dashed and dotted line at 15a. It it also possible to supply liquid or additional liquid from above as shown by broken lines at 15b. At 20a is indicated an extension of the drain pipe 20 for separate removal of liquid through the wall of the inlet chamber. In the preferred embodiment, the liquid is sprayed in through the nozzle means 15. Gas under pressure is supplied through the inlet 4. The movement paths of the gas, the contact spheres and the liquid are indicated in FIG. 1.

The process will now be described more closely:

The raw gas at pressure is supplied through the inlet 4 and the inlet chamber 9 and flows at relatively high speed through the inlet orifice 11 into the contact chamber 8. Treatment liquid is sprayed into the chamber 8 through the same inlet orifice from the nozzle 15. The gas and the liquid flow through the contact sphere bed and lift the spheres 16 so that a flow of gas, liquid and contact spheres moves upwards towards the upper limiting grid 12, where it is deflected to the sides of the contact chamber. The gas, however, will pass through the grid 12 and flow into the outlet chamber 13, passing the mist eliminator 14, and then exhaust through the outlet 6. The liquid and the contact spheres thereupon follow an outer downgoing path along the walls of the contact chamber 8, and the contact spheres collect more or less at the bottom of the chamber 8, to be thrown up again, while the liquid runs down the bottom wall 7 and into the drain gutter 19, because there is no direct vertical gas movement immediately over the gutter 19. Any liquid which runs across the ring cover plate 22 and reaches the inlet opening edge 21 is carried away and recirculated by the vertical gas flow in the central portion of the contact zone. Depending on the ring plate 22 having been designed to cover a larger or smaller portion of the upper opening of the drain gutter 19, a correspondingly larger or smaller quantity of the liquid will be drained off and removed from the contact zone. As mentioned before the ring plate 22 may be fully omitted and the drainage may be controlled in another way, for example by valves. For a special process, there will be no need to vary the quantity of the liquid removed from the contact chamber as the various factors will be adjusted under pilot operation of the plant, and hence remain rather stationary.

During operation, the contact zone has the appearance of a continuous fountain. The contact spheres and new and recirculating liquids are driven by the concentrated stream of gas flow up through the chamber centrally over the gas inlet. Depending upon the weight of the contact spheres, the velocity of the gas, the quantity of the liquid of the contact zone, the height of the "fountain" will vary. In the upper part of the chamber 8 the contact spheres will be deflected towards the side walls under the influence of the dynamic pressure of the gas and the force of gravity, and then they will follow downwardly said walls to form a more or less static bed of spheres at the outer portion of the bottom of the contact chamber. Then the contact elements are again carried along by the gas velocity and circulate up to the active contact zone. In this way a continuous, powerful circulation is established throughout the whole height of the contact zone. The fresh liquid from the nozzle means 15 and the "old" liquid not having been drained off will in principle follow the same paths as the contact spheres, since the liquid is subjected to the same forces, namely the dynamic pressure of the gas and the force of gravity. The high gas velocity causes the liquid to be carried up in atomized form, and some fine droplets of liquid will to some extent pass through the upper limiting grid 12 before falling back down into the contact chamber 8. In the same way as the contact spheres, the liquid is brought down to the funnel-shaped bottom 7 to flow into the drain gutter 19 to be removed from the system. Some of the liquid will recirculate, as explained above. Thus, the principle of the process according to the invention is that the liquid is prevented from flowing back through the inlet opening 11 and is removed in controlled quantities at another location in the lower part of the contact chamber.

Figure 2A:
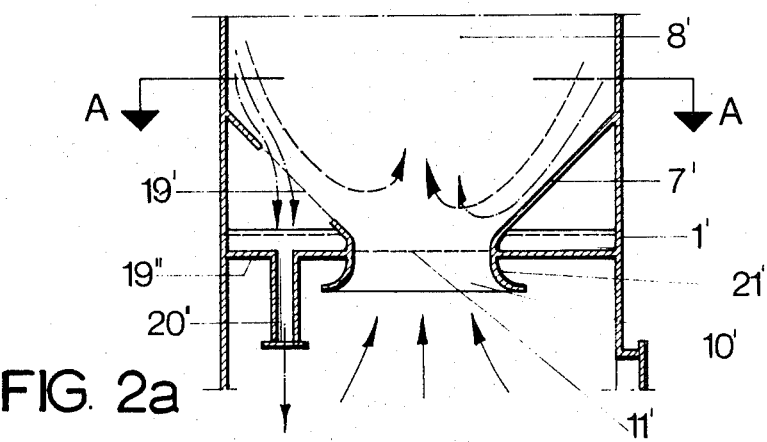
FIG. 2a is a vertical section through the lower part of a contact zone in an apparatus according to another embodiment of the invention.
Figure 2B:
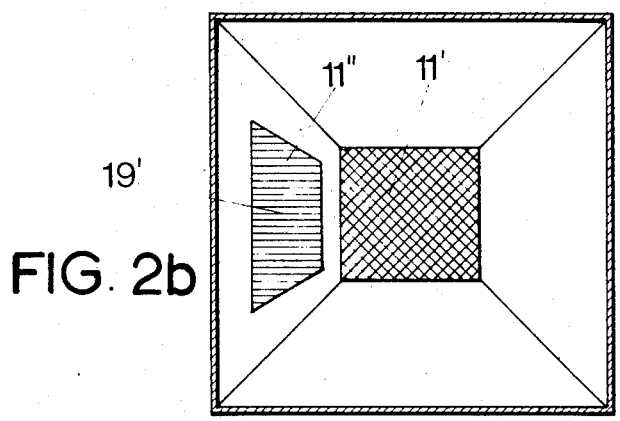

FIG. 2a and FIG. 2b show in vertical and horizontal section, respectively, another arrangement of the lower portion of the treatment chamber. In this case the bottom 7' of the treatment chamber 8' is arranged with a curved orifice lip 21' and at least one outlet opening 19' (one is shown) for the removal of liquid is arranged in the wall of the funnel-shaped bottom. The opening 19' covers only a part of the periphery of the wall and may include smaller openings. A ring-formed liquid and gas-tight partition wall 19'' is arranged between the orifice lip 21' and the mantle 1' to form a drain gutter. An outlet union 20' is arranged as shown. FIG. 2b shows a horizontal section of FIG. 2a in the case of an apparatus of square section. From the Figure it appears that the inlet orifice 10' is covered with a grid 11', and the liquid outlet opening 19' is covered with a separate grid 11''. In this case adjustment of the quantity of liquid removed can be effected by covering a portion of the opening 19'. The mode of operation is the same as explained in connection with FIG. 1.

From FIGS. 1 and 2 appears that the bottom wall 7, the lower grid 11, the gutter 19 can be formed and arranged in various ways. In the embodiments of FIGS. 1 and 2 the lower grid 11 can also be arranged over the funnel-shaped bottom wall 7, for example at about the height of the inlet pipe 15a (FIG. 1). The slope of the bottom wall 7 may be widely varied. If the slope angle is 0 then the bottom becomes horizontal. Negative slope angle is possible but makes provision of a grid over the bottom wall necessary. In the embodiment of FIG. 2 it is possible to form the whole funnel wall 7' as a grid. The embodiment with positively sloping bottom wall (FIG. 1) or grid (may be derived from FIG. 2) is preferred, because it ensures a continuous movement of all contact elements (spheres). The expression grid means any kind of grid, grill, perforated sheet, grate, etc.

It will be easily understood that the new design of the bottom portion of the contact chamber makes it possible to connect the gas inlet opening 10 directly with a gas delivery conduit, such as a delivery pipe. The pipe end (not shown) then would be fixed to the inner wall of the gutter 19 (FIG. 1) or the lower edge of the funnel 7' (FIG. 2a) by any suitable means such as bolting, welding, etc. In such a structure the lower part of the housing 1 and thus the gas inlet chamber 9 can be dispensed with, or saying in other words, the outlet portion of the conduit would serve as the gas inlet chamber.

Figure 3:
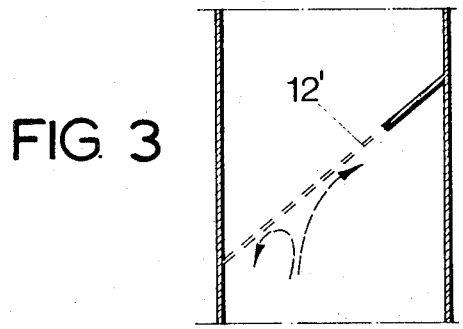
FIG. 3 shows schematically and in section an embodiment of the upper grid.

The impacts of the contact elements against the upper limiting grid in this version increase the wear on the contact elements. They can also cause deformation of the elements or cause them to stick in the grid, which must be as open as possible so as not to present unnecessary hindrance to the passage of gas and liquid. These disadvantages are most apparent in the case of hard blows at right angles to the grid. In order to reduce these disadvantages as much as possible the grid 12' may for example be set at an sloping angle as shown in FIG. 3. The grid may be curved, and/or it may be made of an elastic material in order to reduce wear.

Figure 4:
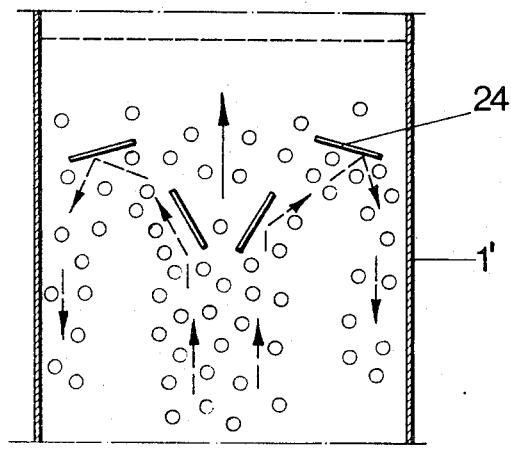
FIG. 4 shows schematically and in cross section an arrangement of baffle plates under an upper horizontal grid which may be arranged in the apparatus in accordance with FIG. 1 or FIG. 2.

Replaceable impact and baffle plates can also to great advantage be arranged below the upper grid, to spread the contact elements or to deflect their vertical movement, so that hard blows at right angles to the under side of the upper grid are avoided. The baffle plate or plates may be solid or perforated, straight or curved. FIG. 4 shows schematic examples of an arrangement of such plates 24, suitable for a gas contaminated with sharp and abrasive dust particles. The plates are provided with coating of rubber (not shown) and they are replaceable. In a tested arrangement the blows against the upper grid were so reduced that wear was no problem. Neither were the impact plates exposed to undue wear.

Figure 5:
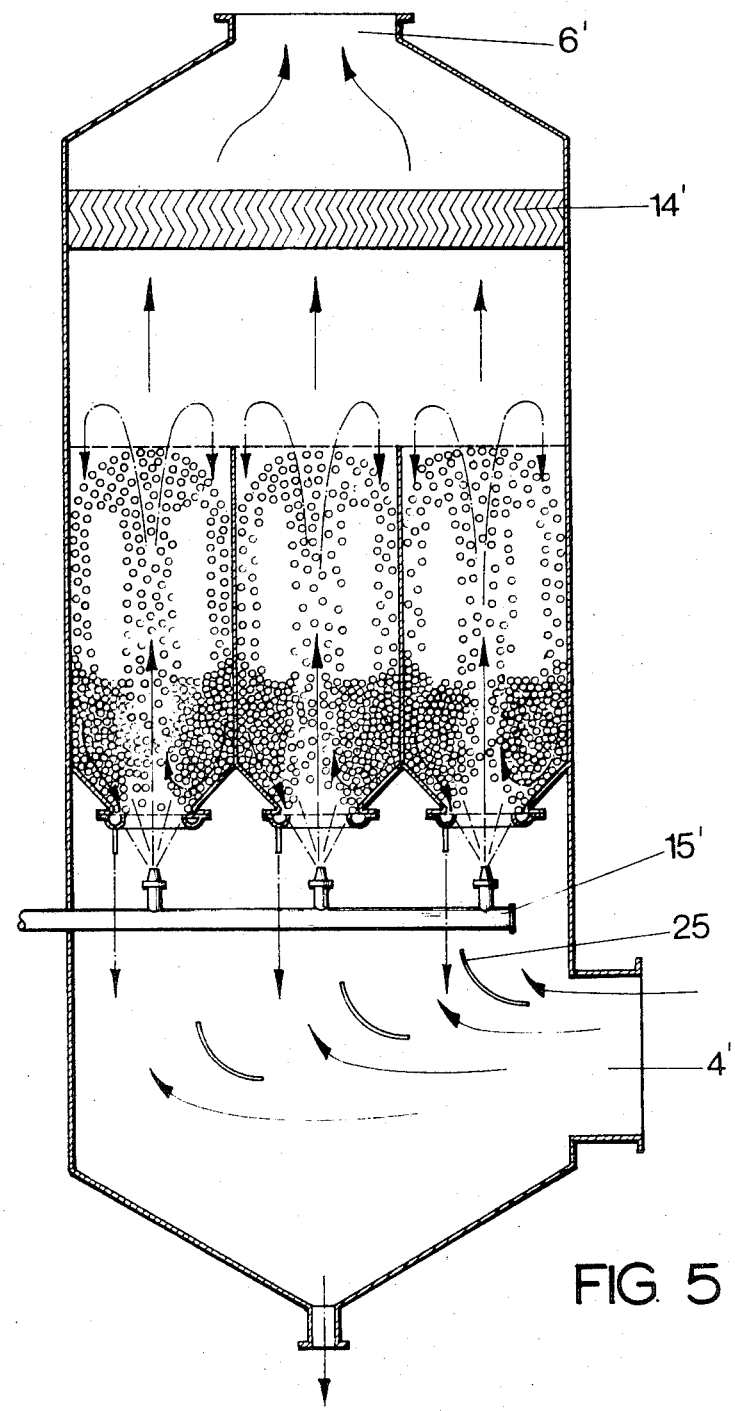
FIG. 5 shows a vertical section of a plant comprising a plurality of apparatus units according to FIG. 1 arranged side by side for parallel operation.
Figure 7:
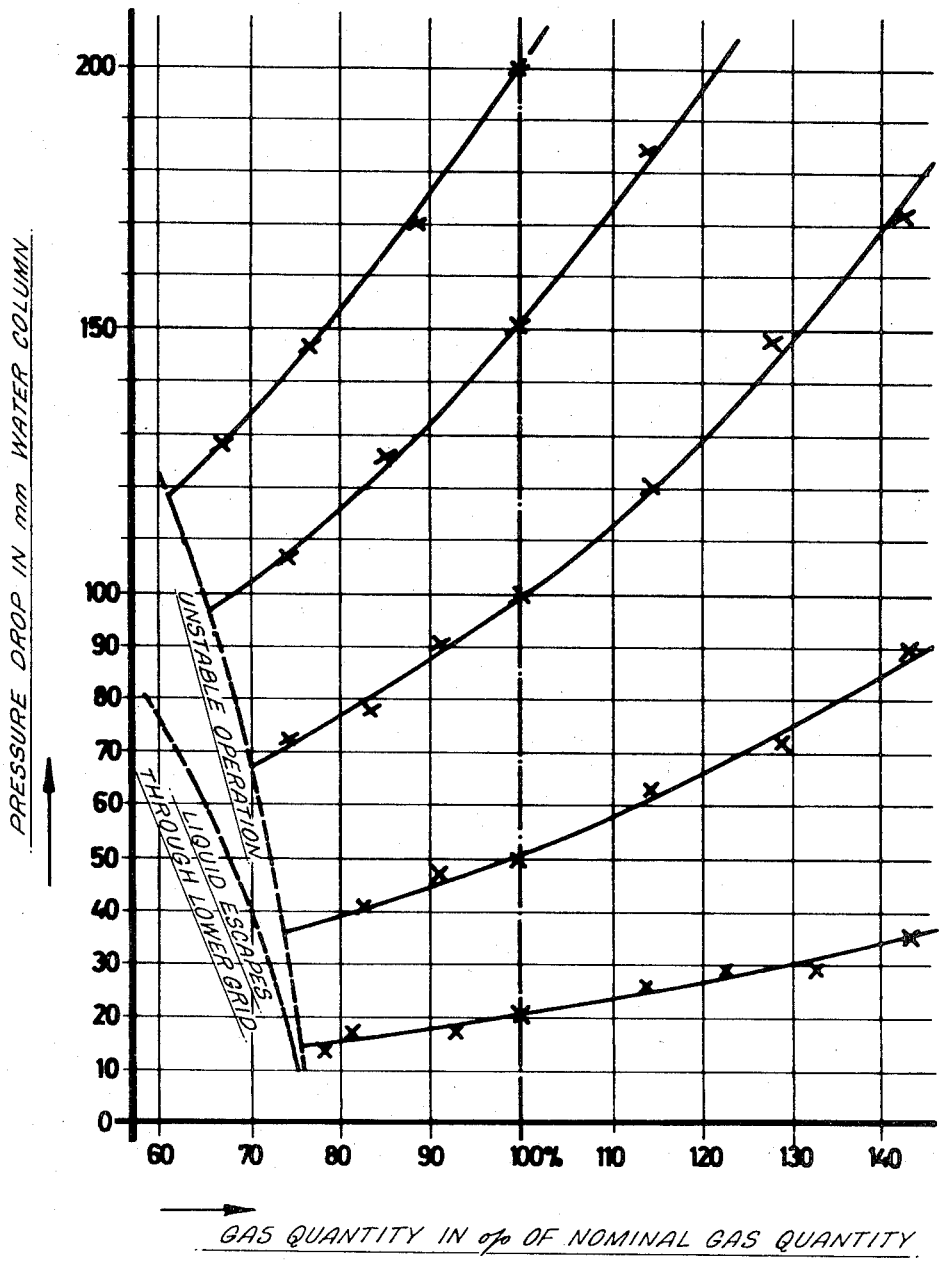
FIG. 7 and 8 are diagrams illustrating the operating conditions under a process according to the invention.

In a contact apparatus according to the present invention the pressure drop is increasing strongly through the apparatus when increasing the quantity of gas flow (see FIG. 7). This fact makes the apparatus well suited for parallel operation. In case of large quantities of gas the apparatus can therefore be built with a plurality of parallel contact chambers each forming a part of the total cross section of the apparatus, as shown in FIG. 5. Each contact chamber is arranged as an independent unit, while the inlet 4', mist eliminator 14' and outlet 6' are common to all the contact chambers. The gas distribution to all chambers is very even, even with uneven gas velocity at the common gas inlet. Nevertheless, the gas velocity should be equalized as well as possible by suitable arrangements in the common inlet part, e.g. by means of baffles 25, especially when the pressure drop through the contact zones is low. Liquid supply is normally arranged by means of supply mains 15' and a suitable supply device under the gas inlet to each section.

Figure 6:
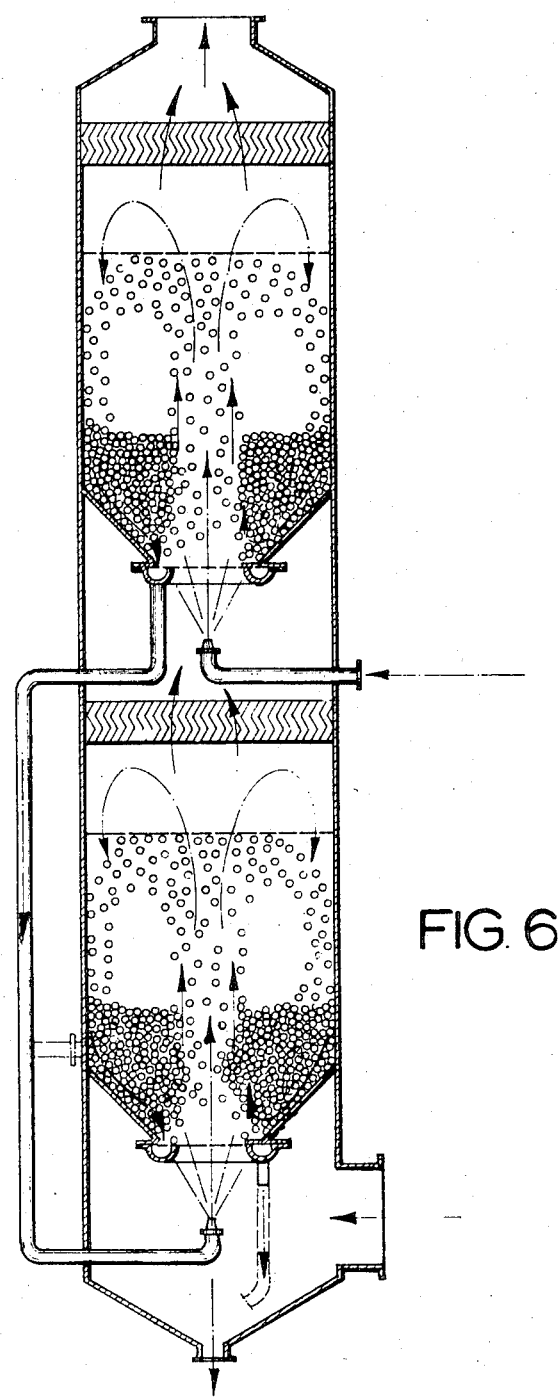
FIG. 6 shows a vertical section of a plant with apparatus units arranged above each other for series operation.

An apparatus according to the present invention can also be suitably arranged with contact chambers arranged in series one above the other, in which each chamber in principle forms a complete, separate unit in accordance with FIG. 1. The principle of the arrangement is shown in FIG. 6. Fresh liquid is supplied to the upmost contact chamber, while drain liquid from said chamber flows to the inlet of the lower chamber. Gas is supplied to the inlet of the lowest unit as shown by arrow. An arrangement of this kind is more economical in operation than a plant of two or more separate towers connected in series by means of conduits and provided with pumps to circulate the liquid from one tower to the next one. The liquid must not be able to pass uncontrolled from one contact chamber to the next. There will be no descending liquid except in the drain pipe, since the liquid cannot penetrate downwardly the gas inlet to each contact chamber. Ascending liquid spray or vapor is arrested by a mist eliminator over the lowest contact chamber. In practice, the head of liquid passing through the drain pipe from an upper to a lower unit must be at least approx. 2 meters in order to obtain sufficient pressure at the nozzle under the inlet to the contact chamber below. In this apparatus, low-pressure distribution nozzles are used, since all atomization takes place within the chamber.

In the case of contact chamber and apparatus with relatively small heights (low pressure scrubbers) it may be necessary to take the liquid into the lower contact chamber through an inlet in the contact chamber wall, since the liquid head is too low to obtain satisfactory nozzle operation, see 15a in FIG. 1 and also FIG. 6. In practice, this solution can be used in most cases where gas or liquid does not contain impurities or ingredients which may cause deposits or sludge problems at the lower grid, when this is not continuously rinsed from below by a nozzle.

Normally, it will be most suitable to supply the liquid from below. The function of the apparatus remains unchanged, since fresh liquid will mix with recirculating liquid and be drained off at the gutter 19 or circulated up through the contact zone in the same way as explained above in connection with FIG. 1.

When liquid supply is arranged in the contact chamber wall only, as shown at 15a in FIG. 1, no liquid is flowing through the nozzle 15, so it cannot become clogged. An arrangement as shown at 15a in FIG. 1 is therefore of advantage when the available liquid pressure is low, and/or when the liquid contains substantial impurities.

A number of experiments which have been carried out will be described under reference to diagrams in FIGS. 7 and 8. The media used in examination of capacity/pressure drop characteristics and ability to separate solids were air and water at normal room temperature. In examination of gas absorption, air and water were used, with the addition of chemicals. The applicants have made tests with a contact apparatus according to the present invention, with a cross section of 1 × 1 meter, arranged for simple modification for various pressure drops through the chamber. Spheres of plastic were used as contact elements, the dimensions, weight and numbers varied within wide ranges.

It was found that a contact apparatus according to the present invention is extremely flexible as regards the pressure drop which can be obtained through an individual treatment chamber. In one individual chamber pressure drop was varied in the range from about 20 mm water column up to about 300 mm water column.

It has been found that in principle there is no theoretical limit to the pressure drop which can be obtained through an individual chamber according to the present invention. However, any appreciably lower pressure drop than about 15 mm water column would hardly be possible.

In the range from 20 mm water column to 300 mm water column the total chamber height may vary from e.g. about 0.8 to about 2.5 m, given a chamber cross section of about 1 m². The gas inlet velocity will then vary from about 10 m/sec. to about 30m/sec. Using spheres of diameter 30/50 mm, good results have been obtained in the pressure range 20/300 mm water column with sphere weights of from 2.5 to 10 grams and with a quantity of from about 3,000 to about 30,000 elements in the contact chamber.

Measurements have been made of the characteristics of the apparatus (pressure drop through the chamber as a function of gas velocity) for a number of different designs giving different pressure drop with nominal gas quantities. Tests were made for $p_{nom} = 20, 50, 100, 150$ and 200 mm water column. The relevant characteristics are shown in FIG. 7.

As will be seen from FIG. 7 the range of variation of gas velocity from a nominal gas quantity is very wide. The lower limit is determined by the commencement of pulsations and uneven operation, which cause partial escape of liquid through the lower grid. The upper limit of gas velocity is essentially only by the wear on contact elements and grids. Increasing velocity increases both the frequency and force of internal collisions between the spheres and between the spheres and grids.

It has been found that for a given pressure drop optimum separation of gaseous and solid impurities is obtained within a relatively wide range of variations of weight of liquid in circulation in the chamber. The quantity of liquid is limited upward by flooding tendencies and pulsating movements of the contact sphere bed. The lower limit of liquid quantity occurs when the contact elements are insufficiently wetted. Since the quantity of liquid recirculated within the contact zone can be varied by controlling the percentage of the liquid drained off through the gutter the liquid quantity in the contact chamber could be varied under test relatively independently of the quantity of liquid supplied. The largest quantity of liquid supplied during tests was about 10 liters per $1m^3$ of gas. Dependent to some extent upon the pressure drop through the chamber this seemed to be close to the maximum permissible liquid supply with fully open drain gutter, i.e., minimum recirculation and dwelling time in the contact chamber. The smallest quantity of liquid supplied under test was 0.05 liters per $1m^3$ of gas. This gave fully satisfactory wetting of the contact zone with the drain gutter covered about 90 percent. The minimum quantity of liquid supplied from the point of view of wetting of the contact zone seems to be limited only by evaporation of the liquid and/or too high a degree of sludging during recirculation.

Measurements have also been made of the degrees of separation of water soluble gaseous impurities and very favorable results have been obtained.

Measurements have been performed of the degree of separation obtained in the apparatus of dust-like impurities in air. Commercial test dusts of known type were used, such as ground and screened quartz and dolomite (Microdol). Water was used as the washing medium, with varying recirculation of the liquid. It is known in dust separation technology that the degree of separation of dust in a good wet washer is proportional with the total net energy consumed in the actual washing process provided the process is carried out so that it does not allow "short circuits," i.e., that parts of the dust-bearing gas stream have little or no contact with the liquid.

The tests made with an apparatus according to the present invention have shown that the apparatus has a separation efficiency for dust which, in relation to net energy consumption, is at least fully equal to the best types of known modern conventional wet washers. Tests have also shown that the separation capacity of the apparatus is substantially proportional with the pressure drop through the contact zone, independently of how this pressure drop is brought about. The separation capacity, for example, is independent of the supply of liquid and international recirculation conditions, as long as the necessary minimum of liquid for full wetting of the contact elements is present in the contact zone. The separation capacity appears to be a simple function of the pressure drop.

Figure 8:
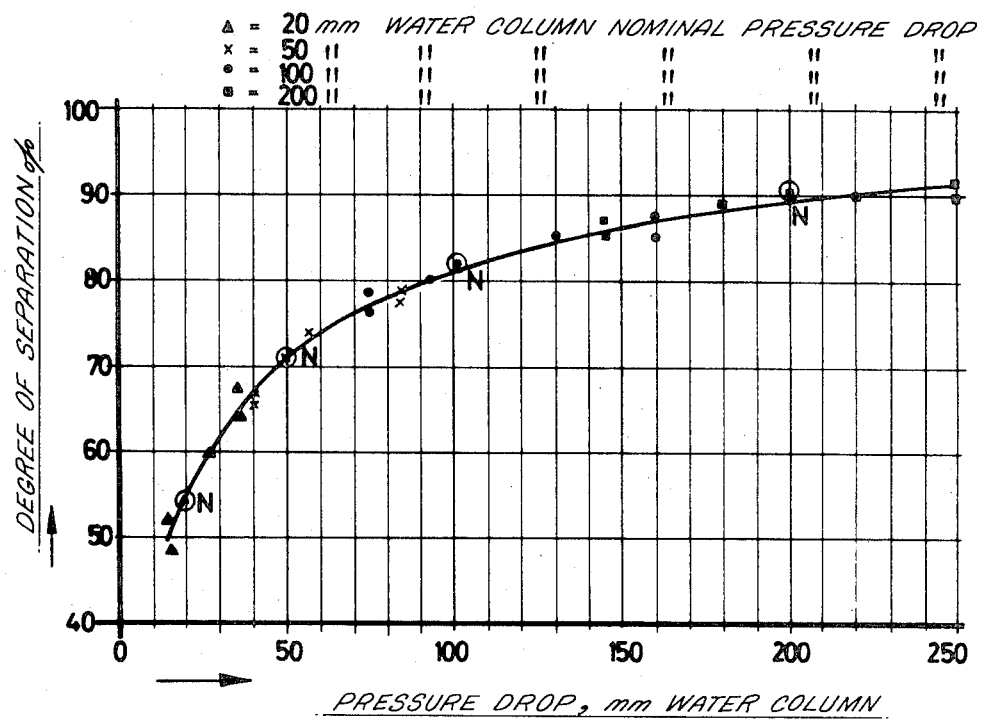

The diagram in FIG. 8 shows the separation capacity as a function of the pressure drop through the contact zone. The test dust used was commercial Microdol in concentrations of from about 50 to about 200 mg/Nm3. The total net energy in the contact zone may be taken to be equal to energy of the gas since the energy in the liquid supply (nozzle pressure x liquid quantity) was minimal in relation to gas energy. A curve has been produced by arranging the test scrubber for four nominal pressure drops (20, 50, 100, 200 mm water column) at nominal gas quantity, and each arrangement was operated with capacity variations from 75–80 percent and up to 130 – 145 percent of nominal gas quantity.

The above mentioned tests are included by way of example only. The apparatus and the procedure according to the invention can be used wherever conventional apparatus with fluidized beds are used, especially for the separation of impurities of gaseous and solid or aerosol type from waste gases and industrial reaction gases, also with chemical neutralization or reaction in the apparatus itself, direct cooling, heating, heat transfer or wetting, de-gassing or other processes where a flexible, reliable apparatus is required affording contact between more or less contaminated fluid and liquid.

It should be understood that various changes, modifications, and alternations may be made in the described embodiments of the present invention without departing from the spirit and the scope thereof as defined in the appended claims.

I claim:

1. An apparatus for obtaining interphase contact between fluids, particularly gas and liquid, comprising a substantially vertical housing having at least a side wall, and upper and lower mutually spaced partition walls defining a gas and liquid contact chamber therebetween, said chamber containing a plurality of light weight contact bodies, a gas inlet chamber under the lower partition wall, a gas outlet chamber over the upper partition wall, said upper and lower partition walls being at least partly penetratable to fluids and not penetratable to the contact bodies, means to supply liquid to the contact chamber, said gas inlet chamber having at least one inlet opening arranged to be connected with gas supply means, and a gas inlet passage between the gas inlet chamber and the contact chamber, wherein said lower partition has a bottom wall between the contact chamber and the gas inlet chamber, said bottom wall having a gas passage opening with a cross section substantially smaller than the cross section of the contact chamber, the bottom wall sloping downwardly and inwardly from the casing side wall toward the passage opening, the liquid drainage means comprising an annular liquid-collecting gutter adjacent the lower end of the bottom wall surrounding the opening, said gutter having its top at least partially open and having a rounded inner wall portion defining a gas passage throat with upwardly decreasing cross section, said gutter having drain means therein to discharge from the apparatus a portion of the liquid collected in the gutter, the remaining portion being recirculated into said throat over said inner gutter wall portion, and means to inject fresh liquid into the gas flowing through said opening including a liquid supply nozzle mounted centrally under the gas passage opening and projecting a jet of liquid upwardly therethrough.

2. An apparatus according to claim 1 characterized in that baffle plates are provided in the upper portion of the contact chamber.

3. A plant characterized in that a plurality of apparatus according to claim 1 are arranged side by side for parallel operation and having common gas inlet and outlet chambers.

4. A plant, characterized in that at least two apparatus according to claim 1 are arranged upon one another for operation in series.

5. An apparatus according to claim 1 wherein said drainage gutter is mounted at the lower end of the bottom wall, said gutter having an open top and having an outer wall portion connected with said lower bottom wall end, said outer and inner gutter wall portions connected by a gutter bottom portion having at least one opening therein to constitute said drain means.

6. An apparatus according to claim 5, characterized in that a cover plate is provided to cover a portion of the gutter top.

7. An apparatus according to claim 5, characterized in that a screen covers the gas passage opening and the gutter top.

8. An apparatus according to claim 7, characterized in that a cover plate is provided to cover a portion of the gutter top.

9. An apparatus according to claim 1, wherein a second wall is provided extending between the lower portion of the sloping bottom wall and the casing wall, at least one outlet aperture in said second wall to provide said drainage gutter for the liquid from the contact chamber, said sloping bottom wall having an opening to provide an inlet into said gutter.

10. An apparatus according to claim 9, characterized in that a screen covers the gas passage opening and the gutter inlet.

11. An apparatus according to claim 9, characterized in that the sloping bottom wall is made as a screen.

* * * * *